United States Patent Office 3,493,365
Patented Feb. 3, 1970

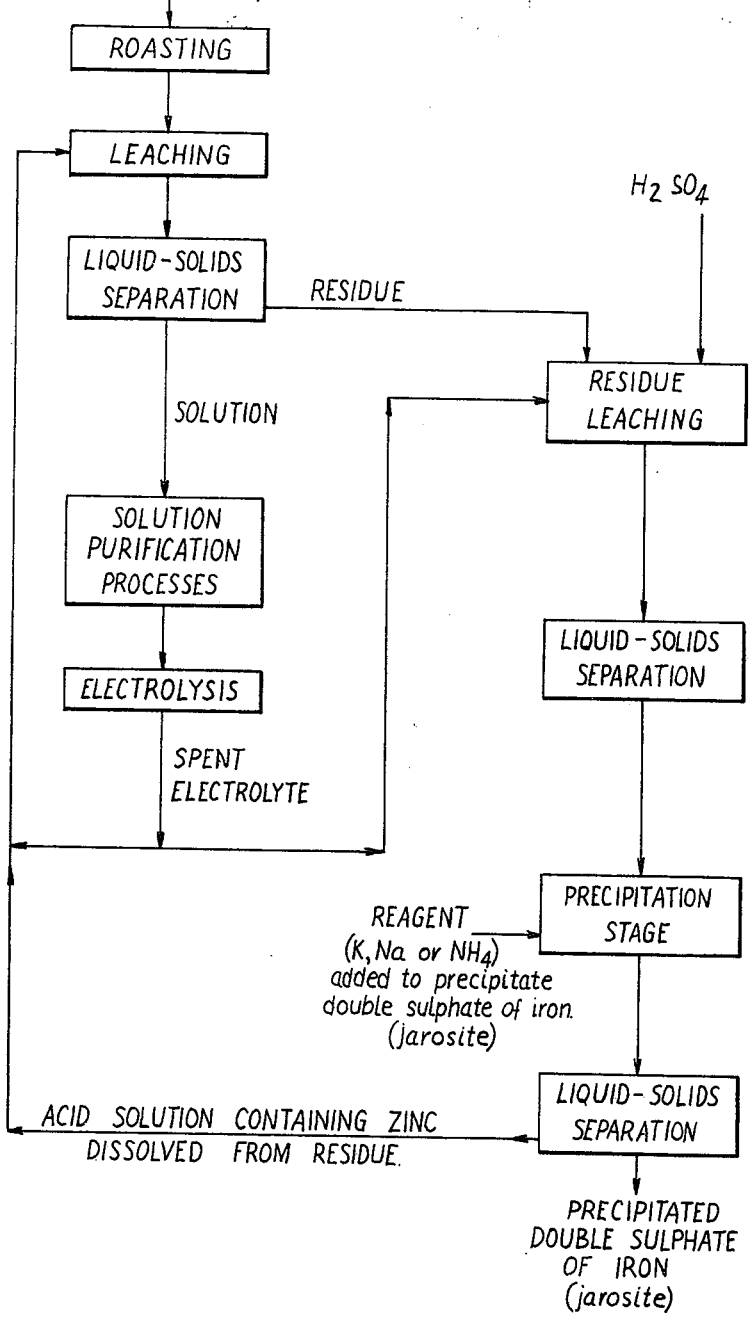

3,493,365
TREATMENT OF ZINC PLANT RESIDUE
Ralph W. Pickering, Sandy Bay, Tasmania, and Curzon J. Haigh, Lindisfarne, Tasmania, Australia, assignors to Electrolytic Zinc Company of Australasia Limited, Melbourne, Victoria, Australia, a corporation of Victoria
Filed Mar. 15, 1966, Ser. No. 534,511
Claims priority, application Australia, Mar. 31, 1965, 57,013/65
Int. Cl. C22b *19/22;* C01g *49/00*
U.S. Cl. 75—101    1 Claim

ABSTRACT OF THE DISCLOSURE

Electrolytic zinc plant residues are treated by a process which involves the leaching of the residue with aqueous sulphuric acid and the treatment of the liquor so obtained with a suitable soluble salt of sodium, potassium or ammonium, suitably the sulphate, or with ammonia, so as to precipitate the iron content of the liquor in the form of an insoluble double sulphate of the jarosite type.

---

This invention relates to a process concerned with the hydrometallurgical extraction of zinc from zinc plant residue. In this application the term "zinc plant residue" or simply "residue" refers to the undissolved material remaining when roasted or almost completely roasted zinc sulphide concentrate is leached with liquor containing sulphuric acid in the normal course of the electrolytic zinc process.

It is well known that during the roasting process any iron in the zinc sulphide concentrate combines to a substantial extent with zinc to form zinc ferrite, generally taken to have the formula $ZnFe_2O_4$, which is not dissolved to any appreciable extent in the normal leaching operation. As a result, the residue from the leaching stage commonly contains significant quantities of zinc in the ferritic form. It will also contain some zinc sulphide, the actual amount being dependent on the completeness of the roasting operation. The residue may also contain quantities of other valuable metal compounds such as those of lead, cadmium, silver and gold, which have not been dissolved in the leaching operation.

In the case of the applicants' works at Risdon, Tasmania, for example, the residue contains about 22% zinc, of which 75 to 90% is usually in the ferritic form and much of the balance of the zinc is present as zinc sulphide.

The lead content of the residue is of the order of from 5 to 7%.

The iron content of the zinc plant residue presents a problem in the development of any hydrometallurgical process as the iron combined as ferrite is also dissolved under conditions in which zinc is extracted from the residue. As the residue treatment process of this invention would most probably be incorporated with an existing electrolytic zinc plant, it is necessary to purify the solution of dissolved iron as in all electrolytic zinc plants the presence of significant quantities of iron in solution interferes with the processes for the production of electrolytic zinc.

In the normal primary leaching of zinc oxide from calcine in electrolytic zinc plants some iron is dissolved, and this iron must be subsequently removed from solution. It is advantageous for some iron to be dissolved in the leaching stage as many of the otherwise toxic impurities such as arsenic, antimony, germanium and tin are also removed from solution in the iron purification stage. Although various modifications of the normal leaching operation are conducted in different plants, all modifications have in common the requirement of dissolving a small amount of iron, so that these otherwise toxic impurities can be removed. In general, the primary leaching and purification operations in electrolytic zinc plants are carefully controlled to maintain a balance between the dissolution of iron from zinc, oxide, calcine, and the efficiency and limitations of the iron purification step.

As the residue treatment process described herein would most probably be integrated with an existing electrolytic plant, in order to maintain the abovementioned balance it is desirable to minimize the iron content of leach solution entering the electrolytic plant from the residue treatment process. The exact level of iron which can be tolerated will depend on the relative size of the residue treatment process.

It is an object of this invention efficiently to extract the zinc present as zinc ferrite in zinc plant residue, while minimizing the iron content of the resulting solution.

It has been found that by leaching the residue in a solution containing excess sulphuric acid preferably at a temperature near the boiling point of the solution at atmospheric pressure, substantially all of the zinc and iron combined as ferrite in the residue can be dissolved.

It has also been found that the resulting leach solution preferably after the separation of the undissolved residual solids, can be substantially purified of the dissolved iron by adding certain reagents, and heating the solution to a temperature between 140 and 240° C. Under these conditions iron can be precipitated from solution to such an extent that the final solution can contain less than 3 gms. of iron per litre.

The addition of, or the presence of reagents such as compounds of potassium, sodium, or ammonium, either singly or as mixtures, in the precipitation stage results in the precipitation of ferric iron as the double sulphates of iron and of the particular precipitating reagent or reagents being used. The double sulphates approximate to the composition of members of the jarosite group of compounds which have the general formula $$AFe_3(SO_4)_2(OH)_6$$

where A can be potassium (K), sodium (Na), ammonium ($NH_4$) or hydroxonium ($H_3O$).

The advantage to be obtained by the use of these reagents as precipitants for iron can readily be appreciated if a comparison is made between the quantities of, say, ammonia required to form ammonio-jarosite compared with the amount of ammonia required, if used as a base, to cause the hydrolysis of iron as ferric hydroxide—a form in which iron is frequently removed from solutions.

If ammonia is used as a base to precipitate ferric iron from a solution containing ferric sulphate, the reactions that occur can be represented by the equation $$Fe_2(SO_4)_3 + 6NH_4OH \longrightarrow 2Fe(OH)_3 + 3(NH_4)_2SO_4$$

Thus, the precipitation of each mole of ferric hydroxide requires the addition of three moles of ammonia.

If, on the other hand, ammonia is used in the manner of this invention to precipitate ferric iron as the ammonio-jarosite, the reactions that occur can be represented by the equation $$3Fe_2(SO_4)_3 + 2NH_4OH + 10H_2O \longrightarrow$$
$$2NH_4Fe_3(SO_4)_2(OH)_6 + 5H_2SO_4$$

or, if a salt such as ammonium sulphate is used, the reactions can be expressed by the equation $$2Fe_2(SO_4)_3 + (NH_4)_2SO_4 + 12H_2O \longrightarrow$$
$$2NH_4Fe_3(SO_4)_2(OH)_6 + 6H_2SO_4$$

Precipitation of the equivalent of six moles of ferric hydroxide, when precipitated as ammonio-jarosite, requires the addition of only two moles of ammonia.

Thus, it can be seen that nine times as much ammonia is required to precipitate ferric iron from solution as ferric hydroxide than is required to precipitate ferric iron as ammonio-jarosite.

There is the additional difference also that free acidity in solution must first be neutralized, in part at least, if ferric iron is to be precipitated as the hydroxide, whereas jarosites can be precipitated from solutions containing free acid.

In practice the situation is somewhat more complicated because there is a tendency for mixed jarosites or mixtures of jarosites to form in acid solutions, part of the iron being precipitated as the hydroxonium jarosite (otherwise known as carphosiderite). Thus the amount of ammonia needed as a reagent for the precipitation of iron as a jarosite under certain circumstances may be even less than one-ninth of that required for precipitation of the equivalent amount of iron as the hydroxide.

The method of the present invention for treating zinc plant residue comprises in general the steps of leaching the residue in a solution containing excess sulphuric acid, heating the leach solution to an elevated temperature, and preferably to a temperature above the boiling point of the solution at atmospheric pressure, in the presence of ions such that ferric iron is precipitated as an insoluble double sulphate of the jarosite type, and separating the purified leach solution, preferably containing less than 3 gm. of iron per litre, from the precipitated iron compound. The undissolved residual solids may be separated from the leach solution before proceeding to the precipitation step. The presence of potassium sodium, or ammonium ions to precipitate the iron from solution is preferred, advantageously in an amount from 0.5 to 3.0 times the stoichiometric requirements to precipitate all the ferric iron. During the precipitation step the amount of free $H_2SO_4$ present is preferably between 20 and 75 gms. per litre.

The leaching step comprises treating the residue with a solution containing an excess of sulphuric acid at a temperature preferably between 60° C. and the boiling point of the solution at atmospheric pressure. As the temperature is reduced below about 80° C. the extraction of zinc and iron proceed progressively more slowly. The rate of extraction of zinc and iron from the residue is rapid during the initial stages in a batch process, and the extent of extraction increases as the leaching period is extended. The duration of the leaching period is therefore determined by the maximum extraction of zinc which can be attained in a reasonable time. It has been found that satisfactory results are obtained when the leach is conducted for 6 hours at 95° C. under batch or co-current continuous operation, and for shorter periods under counter-current continuous operation.

Iron also dissolves from the residue at the same time as the dissolution of zinc proceeds. Some ferrous sulphate is usually formed by the reaction of part of the ferric sulphate in solution with part of the zinc sulphide present in the residue. The formation of ferrous sulphate is generally increased by an increase in the leaching temperature and by an extension of the leaching period.

It is found that about a 10% excess of sulphuric acid, above the stoichiometric quantity required to dissolve the zinc ferrite content of the residue, according to the following equation, is a satisfactory acid concentration

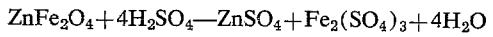
$$ZnFe_2O_4 + 4H_2SO_4 \rightarrow ZnSO_4 + Fe_2(SO_4)_3 + 4H_2O$$

This amount of excess acid is sufficient to maintain a fast rate of solution of the ferrite. It also enables sufficient free, or uncombined, sulphuric acid to remain in solution to stabilize the ferric iron, and thus prevent hydrolysis and precipitation of iron on the leaching stage. The amount of free acid required to stabilize the ferric iron in solution increases with an increase in the leaching temperature, in the concentration of ferric sulphate, and in the concentration of any of the precipitants, potassium, sodium, or ammonium ions which may already be in solution.

Although higher acid concentrations can be employed with a consequent increase in the rate of zinc ferrite dissolution, in order to achieve the maximum separation of iron in the precipitation stage too much excess acid should preferably be avoided.

Consequently where a high acid concentration is employed in the leaching stage the excess acid may be partially neutralized by the addition of zinc oxide calcine, or other suitable neutralizing agent, prior to the iron precipitation stage.

Although any hydrolysis and precipitation of iron during the leaching stage does not seriously affect the rate or extent of zinc extraction from zinc ferrite, it would contaminate the undissolved residual solids. In the applicant's case the undissolved residual solids are a valuable source of metals such as lead and silver, and any unnecessary contamination is therefore undesirable. In a plant treating residue which does not contain any valuable metals other than zinc, re-precipitation of part of the iron from solution during the leaching stage would not be a serious matter.

As the residue treatment process described herein would most probably be integrated with an existing electrolytic zinc plant, an advantage is therefore to be gained by the use of spent electrolyte as the leaching solution. This process is not restricted to the use of spent electrolyte however, and is understood to include the use of all sulphuric acid solutions of total acid concentrations greater than about 15 gm. of sulphuric acid per litre. At acid concentrations greater than about 300 gm. of sulphuric acid per litre, difficulties are encountered due to viscosity and solubility limits and therefore this level of acid concentration represents a practical upper limit.

If the residue treatment process described herein is incorporated with an existing electrolytic zinc plant any sulphate losses, either from the normal zinc plant processes, or combined as double sulphates in the precipitation stage of the process, could with benefit, be replaced with concentrated sulphuric acid which may be used to fortify the spent electrolyte used in the leaching stage of the process.

In the applicants' case fortification of spent electrolyte from the normal 95 gm. of sulphuric acid per litre to a total of about 140 gm. of sulphuric acid per litre is a suitable level of fortification.

With this degree of fortification and with a solids loading of about 110 gm. of residue per litre, to give a solution containing preferably about 25 to 35 gm. of iron per litre, the concentration of free sulphuric acid in the solution leaving the leaching stage is between 15 and 30 gm. per litre. This level of acid is just sufficient to prevent hydrolysis of iron during the leaching stage under the preferred leaching conditions.

The solids loading may, in other circumstances, vary between 50 and 200 gm. per litre.

After the leaching stage the solution containing dissolved zinc and iron is preferably separated from the undissolved residual solids. The method of separation is not important and can be conducted by the most convenient methods available. Although in the applicants' case it is highly desirable to separate undissolved residual solids, as they constitute a valuable by-product, this need not always be the case. If the undissolved residual solids do not contain significant quantities of potentially valuable metals, then it is not necessary to separate them from the leach solution at this stage.

With the applicants' zinc plant residue, the undissolved residual solids remaining after the leaching stage are enriched with respect to zinc and cadmium sulphides as well as with valuable metals such as lead, silver and gold. It is desirable to separate the sulphide materials from the residual solids and return these sulphides to the roasting plant for retreatment. Flotation and hydrocyclone treatments have proved satisfactory methods of separation. By such treatments the residual solids are separated into two fractions, namely a zinc sulphide rich fraction, and a second fraction still further enriched with respect to lead, silver and gold. Depending on the original residue composition and the degree of enrichment, the second fraction may be suitable for treatment in a lead smelting operation, or the metal values may be extracted by other established processes.

The leach solution, preferably after separation from undissolved residual solids, is then passed to the precipitation stage where the necessary reagent or reagents are added, and the solution is heated in a pressure vessel, such as an autoclave, to a temperature preferably in the range 140 to 240° C.

In the absence of added reagents the extent of the reactions and the composition of the iron compounds precipitated from the zinc rich solution will depend on the temperature to which the solution is heated and on the composition of the solution. In general, however, precipitation of iron does not proceed far enough for the iron content of the resulting solution to be lowered sufficiently for the solution to join the circuit of an existing electrolytic zinc plant. Although the extent of reaction can be increased by an increase in temperature, operational difficulties, such as a repression of zinc sulphate solubility, may be encountered at higher temperatures.

One of the main objects of the present invention is to precipitate substantially all of the iron dissolved from the zinc ferrite at a moderate temperature so that the purified solution contains a minimum of ferric iron, advantageously less than 5 and preferably less than 3 gm. of iron per litre.

By the addition of a reagent or reagents such as compounds of potassium, sodium or ammonium, substantially all of the iron can be precipitated as the double sulphate or jarosite compound. The extent of precipitation is proportional to the concentration of potassium, sodium or ammonium ions in solution. The type of compound added is also important. At lower temperatures, in the range 60–200° C., potassium jarosite is considerably less soluble than the natro jarosite, which in turn is less soluble than the ammonio jarosite. However, at temperatures above about 170° C. the difference in solubility of the three jarosites is quite small.

At a fixed additive concentration the extent of precipitation is increased by an increase in temperature and by a decrease in the free acid level in solution. Thus, the extent of precipitation may be increased by the addition of zinc oxide calcine, or other suitable neutralizing agent to react with and neutralize free acid, either remaining in solution after the leaching stage, or liberated during the precipitation stage. The addition of excessive amounts of zinc oxide calcine should be avoided however, because of the attendant loss of some zinc in the undissolved residual solids, such as in zinc sulphide originally present in the calcine.

The amount of reagent required to precipitate the majority of the ferric iron from a leach solution increases with an increase in the ferric iron concentration. In particular, the iron concentration in the final solution after precipitation of the jarosite is dependent on the residual concentration of potassium, sodium, or ammonium ions in solution. The higher the concentration of potassium, sodium or ammonium ions the lower the final iron concentration.

Provided the precipitation of the double sulphates is conducted in the range 160–200° C., addition of reagents to give a level of 0.5 to 3.0, but preferably 1.25 to 1.5, times the stoichiometric requirement to precipitate all the ferric iron in a leach solution as the jarosite compound is sufficient to lower the final iron concentration to less than 3 gm. of iron per litre. For example, with a leach solution containing 30 gm. of ferric iron per litre the initial concentration of reagents corresponding to 1.25 times the stoichiometric requirements are 8.7 gm. of potassium per litre, 5.1 gm. of sodium per litre, or 4.0 gm. of ammonium per litre. The formation and precipitation of the double sulphates is rapid so that precipitation is complete with a retention time of 60 minutes or less.

The choice of reagents is dependent on several factors, such as availability, cost, the effect of residual concentrations on other integrated processes, and the economics of the recovery of the reagent from the precipitated jarosite. The point of addition is not of chemical importance and can be at the most convenient point. Thus, the reagent can be injected directly into the autoclave, or added to the leach solution prior to entry into the autoclave, or may be added, or be present in solution during the leaching stage.

In the applicants' case significant concentrations of sodium and potassium ions are present in spent electrolyte which would normally be used as the leach solution. With such leach solutions it is only necessary to increase the alkali metal concentration to a level sufficient to precipitate enough jarosite to lower the final iron concentration to the desired level of less than 3 gm. of iron per litre. This can be done by reagents such as potassium sulphate, sodium carbonate, or aqueous or gaseous ammonia. The choice of reagents and the level of addition will be dependent, in particular, on the effect residual concentrations of reagents may have on the processes normally operated in an electrolytic zinc plant with which the residue treatment process would most probably be integrated.

Although the presence of oxidizing conditions is not essential for the precipitation of ferric iron as the double sulphate, the use of an oxidizing atmosphere in the precipitation stage is desirable. During the leaching stage some ferrous sulphate is formed by the reaction of ferric sulphate in solution with part of the zinc sulphide content of the residue. The most convenient method of removing this ferrous sulphate from solution is to oxidize it to ferric sulphate, which can then be precipitated. Oxidation of ferrous sulphate to ferric sulphate can be conducted in the precipitation stage by the use of an oxidizing atmosphere. The atmosphere can be oxygen, air, oxygen enriched air, or any suitable gas containing free oxygen the quantity required depending on the ferrous iron concentration. In the applicants' case, oxidation of ferrous sulphate in leach solution proceeds at a sufficient rate in the precipitation stage at an oxygen partial pressure in the gas phase as low as 10 p.s.i.

After the precipitation step, the leach solution, substantially purified of dissolved iron, is cooled and separated from the precipitated jarosite. It can then be introduced at an appropriate stage in the normal electrolytic zinc plant circuit. The method of cooling and separation is not critical and can be by the most convenient methods.

It should be noted that this invention relates to the use of the process either on a continuous basis or batchwise. The incorporation of modifications or additions to the leaching and precipitation stages are to be regarded as falling within the scope of the invention. For economy of operation and simplification of procedure, the process as described is particularly suitable for continuous operation. Whether batch or continuous, the essential features of the process lie in a first stage leaching treatment where zinc ferrite is dissolved, followed by a precipitation stage where the major portion of the dissolved iron is separated from the zinc rich solution by precipitation as the double sulphate or jarosite compound.

As an illustration of the operation of the process involving the precipitation of potassium jarosite we quote the following example:

EXAMPLE 1

60 lbs. of residue (containing on a dry basis 31.8% iron, 20.2% zinc, 5.6% lead, 2.45% sulphur as sulphate, 1.2% sulphur as sulphide, moisture 13%) were leached with 50 gallons of dilute sulphuric acid containing 140 gm. of sulphuric acid per litre and 30 gm. of zinc per litre at 90° C. for 6 hours. At the end of this time the slurry was allowed to stand and the leach solution decanted from the settled solids. The composition of the leach solution was 63.4 gm. of zinc per litre, 24.5 gm. of sulphuric acid per litre, 30.5 gm. of total iron per litre, and 2.6 gm. of ferrous iron per litre. Analysis of the settled solids indicated that 82% of the zinc and 85% of the iron content of the original residue had been dissolved.

The leach solution was then diluted by one third of its volume with water to simulate the condensation of live steam which would be used in a large scale autoclave for heating the solution. Potassium sulphate was added to the diluted solution (47 gm. of zinc per litre, 18.4 gm. of sulphuric acid per litre, 23 gm. of total iron per litre, 2 gm. of ferrous iron per litre) at the rate of 10.9 gm. of potassium sulphate per litre, which would give a potassium ion concentration of 4.9 gm. potassium ion per litre.

This solution was then pumped continuously into a stainless steel autoclave externally heated to 160° C. and under an oxygen partial pressure of 100 p.s.i. Solution overflowed continuously from the autoclave into a pressurized catchpot, which was emptied periodically. The retention time in the autoclave was 25 minutes. Once a steady concentration of iron in the overflow liquid had been reached, as indicated by sampling, the feed pump was shut off. Shutting off the pump converted the single stage continuous run into a batch run without the drawbacks of a variable heating up period. Samples were taken at 10 minute intervals, cooled, filtered and analysed.

Identical experiments were conducted at 180 and 200° C. respectively, using fresh solutions of identical composition in each run. The analysis of samples taken after 0, 20 and 60 minutes after shutting off the feed pump are listed below for each of the three operating temperatures.

washed thickener underflow solids (i.e. undissolved residual solids) was 12-15% zinc, 23-28% lead, 10-15% iron, 8-12% total sulphur, 3-9% sulphur as sulphide sulphur and elemental sulphur.

The leach solution was pumped continuously into a three stage autoclave maintained at 180° C. by live steam injection. The total pressure in the autoclave was maintained at 200 p.s.i.g. by the use of compressed oxygen. 25% aqueous ammonia was pumped directly into the first stage of the autoclave at a rate of 1.25 times the stoichiometric requirement to precipitate all the iron in the leach solution as the double sulphate, ammonio jarosite. If no precipitation had occurred this rate of injection would have resulted in a concentration of ammonium ions in solution of between 3.3 and 4.1 gm. per litre, the exact level depending on the initial iron concentration. Precipitation of the double sulphate was rapid, but a retention time in excess of 30 minutes was required to complete the oxidation of ferrous iron to the ferric state, and for a substantially constant iron concentration to be achieved in the final stage.

An average solution composition after precipitation of the double sulphate was 1-3 gm. of total iron per litre, 0.1-0.4 gm. of ferrous iron per litre, 13-18 gm. zinc per litre, and 30-50 gm. of sulphuric acid per litre, the exact figures depending on retention time and the leach solution composition. A typical analysis of the precipitated double sulphate was 0.2% zinc, 34% iron, 3% ammonia as $NH_4$, 40% sulphate. In addition, small but significant quantities of sodium, potassium and calcium were present in amounts dependent on the original residue composition. X-ray diffraction examination confirmed that the major phase precipitated was ammonio-jarosite.

The simplified flow sheet of the accompanying drawing illustrates the manner in which the residue treatment

| Temperature, ° C | Solution compositions, grams per litre | | | | | | | | |
|---|---|---|---|---|---|---|---|---|---|
| | 160 | | | 180 | | | 200 | | |
| Sample times, mins | 0 | 20 | 60 | 0 | 20 | 60 | 0 | 20 | 60 |
| Total iron | 3.8 | 1.8 | 1.2 | 2.6 | 1.2 | 0.8 | 1.8 | 0.8 | 0.7 |
| Ferrous iron | 0.2 | 0.05 | 0.03 | 0.2 | 0.04 | 0.02 | 0.2 | 0.1 | 0.01 |
| Zinc | 49.6 | 49.6 | 49.8 | 49.6 | 49.6 | 49.6 | 49.6 | 49.4 | 49.4 |
| Sulphuric acid | 50.0 | 53.6 | 54.8 | 53.2 | 55.6 | 56.4 | 54.8 | 56.8 | 58.0 |
| Potassium | 1.25 | | 0.75 | 1.0 | | 0.70 | 1.0 | | 0.6 |

The composition of the precipitated iron compound was 0.2% zinc, 7.2% potassium, 33% iron, 39.5% sulphate. X-ray examination confirmed that the only major phase present was the double sulphate, potassium jarosite.

As an illustration of the operation of the process on a pilot plant scale we quote the following example.

EXAMPLE 2

A slurry of dilute sulphuric acid and zinc plant residue (of composition in the range 20-22% zinc, 30-33% iron, 6-7% lead, 1-3% sulphur as sulphide), containing 12.5 lbs. of residue per gallon of slurry was fed continuously at a rate of 40 gallons per hour into the first of a series of four leach tanks connected in series. At the same time dilute sulphuric acid solution of concentration 140 gm. of sulphuric acid per litre was pumped continuously into the same leaching tanks at a rate of 6 gallons per minute.

The fully baffled, stirred leach tanks were maintained at 90-95° C. by the use of either live or indirect steam. Depending on the type of heating the average retention time in the leach tanks was 9-10 hours. The overflow from the fourth leach tank entered a thickener where undissolved residual solids were separated from the leach solution. An average composition of the leach solution leaving the thickener as overflow was 16-20 gm. of zinc per litre, 25-30 gm. of total iron per litre, 2-5 gm. of ferrous iron per litre and 15-25 gm. of sulphuric acid per litre. An average composition of the filtered and process of this invention could be integrated with an existing electrolytic zinc plant.

We claim:
1. In a process for the treatment of electrolytic zinc plant residue which includes the step of leaching the said residue with aqueous sulphuric acid to produce a solution containing zinc and iron, the improvement which comprises treating the leach liquor so obtained, at superatmospheric pressure and at a temperature within the range 140 to 240° C., with a source of a cation selected from the group consisting of $Na^+$, $K^+$ and $NH_4^+$ whereby the iron is substantially completely precipitated from the liquor as a basic double sulphate of iron with sodium, potassium and/or ammonium of the jarosite type.

References Cited

UNITED STATES PATENTS

| 1,503,229 | 7/1924 | Clark | 75—108 |
| 1,834,960 | 12/1931 | Mitchell | 75—115 |
| 2,296,423 | 9/1942 | Clark | 23—126 |
| 2,739,040 | 3/1956 | Mancke | 23—126 |
| 3,434,947 | 3/1969 | Steintveit | 75—108 |

L. DEWAYNE RUTLEDGE, Primary Examiner

T. R. FRYE, Assistant Examiner

U.S. Cl. X.R.

23—126; 75—115, 120, 121